Aug. 9, 1932.  E. NIELSEN  1,871,274
MOTOR SPEED REGULATOR
Filed Nov. 24, 1930
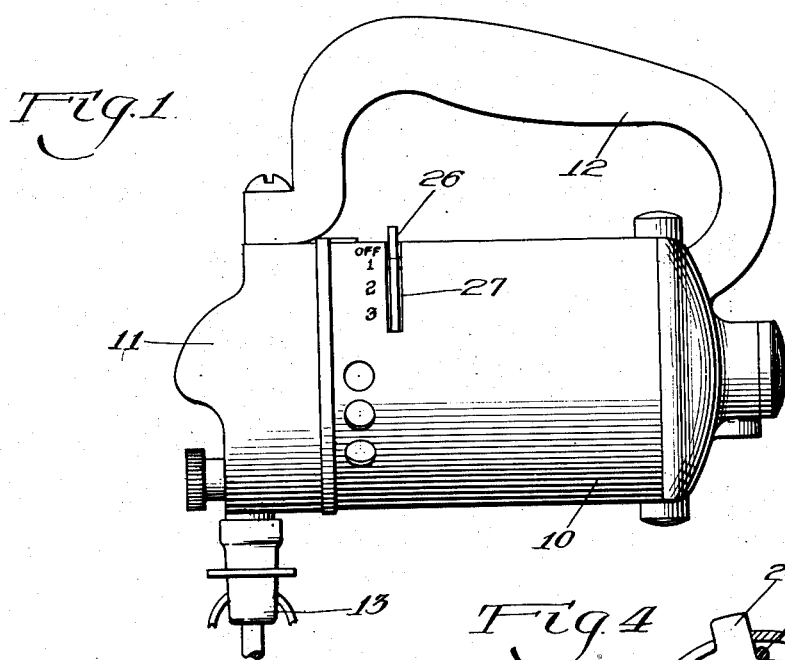
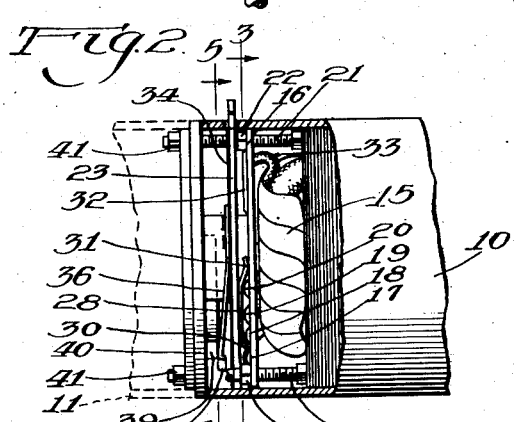
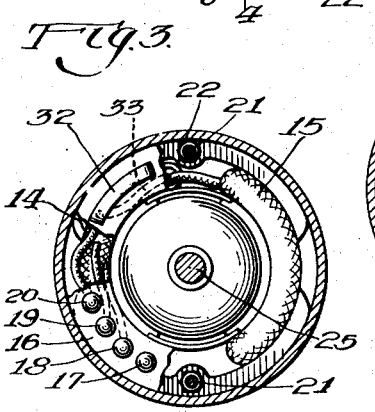
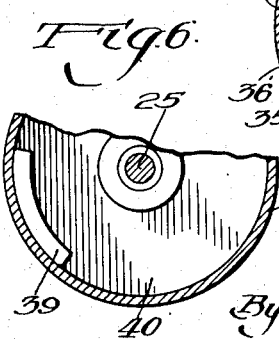
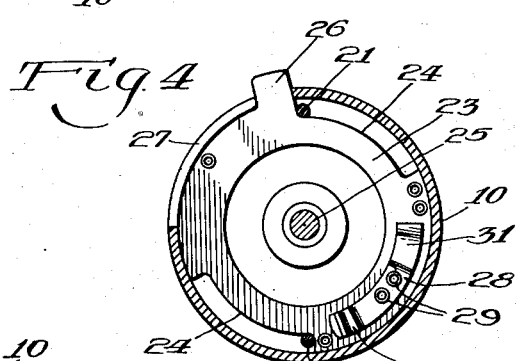
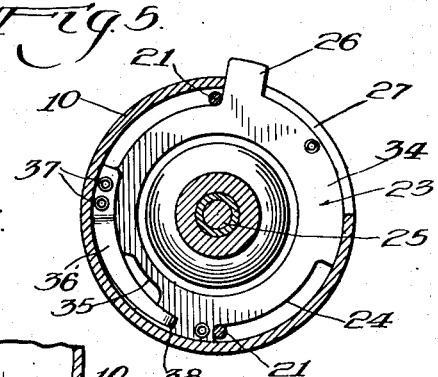
Inventor:
Emanuel Nielsen,
By Bertha L. McGregor
Atty.

Patented Aug. 9, 1932                                                      1,871,274

UNITED STATES PATENT OFFICE

EMANUEL NIELSEN, OF RACINE, WISCONSIN, ASSIGNOR TO HAMILTON BEACH MANUFACTURING COMPANY, OF RACINE, WISCONSIN, A CORPORATION

MOTOR SPEED REGULATOR

Application filed November 24, 1930. Serial No. 497,669.

This invention relates to motor speed regulators and, as herein shown, is embodied in a motor for a motor driven food mixer.

The object of the invention is to provide simple, efficient and dependable speed regulating mechanism, compact in form and suitable for embodiment within the motor casing. In providing a conventional motor with the speed regulator of the present invention, the motor fields are tapped and switch mechanism is located adjacent the field coils. By this means the resistance and consequently the motor speed may be varied. The necessity of shifting the brushes of the motor or the introduction of a rheostat are avoided.

Further objects and advantages of the invention will appear from the following specification:

In the drawing—

Fig. 1 is a side elevation of a food mixer in the motor of which is embodied the invention of the present application, the agitator unit of the mixer being shown as broken away.

Fig. 2 is a side elevation of part of the motor, with the casing broken away to show the speed regulator mechanism.

Fig. 3 is a transverse vertical section taken on the line 3—3 of Fig. 2, looking in the direction indicated by the arrows, the contact points-carrying plate being broken away to disclose the motor parts located rearwardly of said plate.

Fig. 4 is a transverse vertical section taken on the line 4—4 of Fig. 2, looking forwardly as indicated by the arrows, and showing one face of the regulator ring.

Fig. 5 is a transverse vertical section taken on the line 5—5 of Fig. 2, showing that face of the regulator ring opposite the face shown in Fig. 4.

Fig. 6 is a transverse vertical section taken on the line 6—6 of Fig. 2, looking forwardly at the inner face of the front end plate of the motor.

In that embodiment of the invention shown in the drawing, the motor casing is indicated at 10 and the gear casing at 11. 12 is a handle secured to the motor and gear casing, and 13 indicates the agitator unit, only a part of which is shown.

Adjacent the forward end of the field coils 14 and 15 is an apertured plate or flat ring 16 made of suitable insulating material. The plate 16 carries on its forward face a plurality of contact points 17, 18, 19, and 20, respectively. The points 18, 19 and 20 are electrically connected to the field 14, the connection being tapped into the field at suitable spaced apart points, as will be more fully explained. The point 17 is not connected to the field coils.

The plate 16 is apertured near its periphery, at opposite sides, and is mounted within the casing 10 on two longitudinally extending screw threaded rods 21 which extend from the rear to the front end of the motor casing. The plate 16 is retained in its intended fixed position adjacent the field coils 14 and 15 by nuts 22 screwed on the rods 21.

Forwardly of the plate 16, between the rods 21, is a centrally apertured regulator ring 23 made of suitable insulating material, such as bakelite. This is particularly shown in Figs. 4 and 5. The regulator ring 23 is cut away peripherally at opposite sides as indicated at 24, 24, to enable the ring 23 to fit between the rods 21 and to be rotatable about the motor shaft 25 as an axis. The regulator ring 23 is provided with a thumb piece 26 which protrudes from the motor casing 10 through the slot 27. The extent of rotation of the ring 23 is limited by the size of the cut away parts 24 as well as by the length of the slot 27 in which the thumb piece 26 moves.

The regulator ring has on its rear surface, shown in Fig. 4, a switch arm 28 which comprises a piece of spring metal relatively flat between its ends where it is secured to the ring 23 by rivets 29, and bent outwardly from the ring 23 to form a contact member 30 at one end and a contact member 31 at the other end. The contact member 31 is adapted to make contact with a conductor plate 32 on the ring 16 while the contact member 30 is engaging point 18, 19 or 20. The conductor plate 32 is electrically connected with a source of electric current through the wire 33.

On the forward side of the regulator ring, best shown in Fig. 5, is secured a reenforcing metal facing 34, the same being slotted at 35 opposite the rivets 29. Also secured to the facing 34 of the regulator ring 23 is a spring arm 36, the securing means being indicated at 37. The free end 38 of the arm 36 engages a lug 39 cast on the inner face of the front end cover 40 of the motor casing. The rods 21 extend through the cover 40 and by means of nuts 41 on the ends of the rods 21 the parts are held in assembled position, the spring arm 36 bearing against the end plate 40, inwardly of the lug 39, to maintain the regulator ring 23 in proper position so that the switch 28 will be in firm engagement with the winding contacts.

The operation of the device is as follows: When the regulator 23 is in the position shown in Figs. 4 and 5, the thumb piece 26 will protrude from the upper end of the slot 27 of the motor casing and the contact member 30 will engage the contact point 17. The member 31 will be out of engagement with the conductor plate 32. This is the "off" position of the motor regulator. When the thumb piece 26 has been moved slightly downwardly to the point marked "1" on the motor casing (Fig. 1) the contact member 30 will engage the point 18 and the member 31 simultaneously will engage the conductor plate 32. The electrical connection between the point 18 and the field 14 is so arranged that when the circuit is completed the full number of turns of the field is in series and, therefore, this "1" position of the regulator permits the motor to run at its lowest speed.

When the thumb piece 26 has been moved slightly downwardly to the point marked "2" on the motor casing, the contact member 30 will engage the point 19, the contact member 31 continuing to engage the conductor plate 32. The tap from the point 19 to the field 14 is so arranged that part of the number of field coil turns are cut out of the circuit and consequently the motor resistance is decreased and the speed of the motor increased.

When the thumb piece 26 has been moved to "3" position, the contact member 30 will engage the point 20, the member 31 continuing to contact with plate 32. The electrical connection between the field 14 and the point 20 is such that a still larger number of turns are cut out and the motor resistance decreased accordingly. In this position of the regulator the motor runs at its highest speed.

Changes may be made in details of construction without departing from the scope of my invention and I do not intend to be limited to the exact form shown and described except as set forth in the appended claims.

I claim as my invention:

1. A motor having a rotatable shaft, field coils, a casing enclosing the same, and means within the motor casing for regulating the speed of rotation of the motor shaft, said means comprising an insulated member fixedly located adjacent the field coils, a plurality of contact points and a conductor plate carried by the insulated member, the contact points being tapped into the field coils, a ring-like regulator member movably mounted in the motor casing, a contact arm mounted on one face of the regulator member in juxtaposition to said contact points and conductor plate; spring means on the opposite face of said regulator member to urge said member towards said insulated member and means for actuating the regulator member.

2. A motor having a rotatable shaft, field coils, a casing enclosing the same, and means within the casing for regulating the speed of the motor shaft, said means comprising an insulated member fixedly mounted in the motor casing adjacent the field coils, a plurality of contact points tapped into the field coils and carried by said member, a conductor plate also carried by the insulated member and connected to a source of electrical current, a regulator ring rotatably mounted in the casing, a thumb piece on the regulator ring protruding from the casing, and a spring metal contact arm mounted on the regulator ring adjacent the contact points and the conductor plate and adapted simultaneously to engage one of the contact points and the conductor plate.

3. A motor having a rotatable shaft, field coils, a casing enclosing the same, a pair of longitudinally extending rods in the casing, and means within the casing for regulating the speed of the motor shaft, said means comprising an insulated member fixedly mounted on said rods adjacent the field coils, a plurality of contact points tapped into the field coils and carried by said member, a conductor plate also carried by the insulated member and connected with a source of electrical current, a regulator ring rotatably mounted in the casing between said rods, a thumb piece on the regulator ring protruding from the casing, a spring metal contact arm mounted on the regulator ring adjacent the contact points and conductor plate and adapted simultaneously to engage one of the contact points and the conductor plate, an end plate on the motor casing and means on the regulator ring for bearing against the end plate.

4. In a motor, means within the motor casing for regulating the speed of rotation of the motor shaft, said means comprising field coils, an apertured disc made of insulating material fixedly located adjacent the field coils, a plurality of peripherally spaced apart contact points and a conductor plate carried by the disc near its periphery, the contact points being tapped into the field coils, a regulator ring of insulating material rotatably mounted between the disc and one end of the motor casing, a contact arm mounted on the regulator ring, the ends of the arm being bent away from the regulator ring for engaging said contact points and conductor plate, and means for actuating the regulator ring.

5. A motor having a rotatable shaft, field coils, a casing enclosing the same, and means within the casing for regulating the speed of the motor shaft, said means comprising an insulated apertured disc fixedly mounted in the motor casing adjacent the field coils, a plurality of contact points tapped into the field coils and carried by said disc, a conductor plate also carried by the disc and connected with a source of electrical current, the contact points and conductor plate being peripherally spaced from each other, a regulator ring rotatably mounted in the casing adjacent the disc, a thumb piece on the regulator ring protruding from the casing, a spring metal contact arm fixed between its ends to the regulator ring and having its ends bent toward the disc for simultaneously engaging one of the contact points at one end and the conductor plate at the other end, an end plate on the motor casing and a spring arm on the regulator ring for bearing against the end plate.

In testimony, that I claim the foregoing as my invention, I affix my signature, this 19th day of November, 1930.

EMANUEL NIELSEN.